United States Patent [19]
Meyer

[11] Patent Number: 5,476,423
[45] Date of Patent: Dec. 19, 1995

[54] PLASTIC WHEEL ASSEMBLY

[75] Inventor: Leon G. Meyer, Alden, N.Y.

[73] Assignee: Occidental Chemical Corporation, Niagara Falls, N.Y.

[21] Appl. No.: 337,794

[22] Filed: Nov. 14, 1994

[51] Int. Cl.$^6$ ................................................. F16H 55/32
[52] U.S. Cl. ................................................. 474/166; 29/892
[58] Field of Search .............................. 474/166–174, 474/190, 902; 29/892–892.3, 893, 894

[56] References Cited

U.S. PATENT DOCUMENTS

| | | |
|---|---|---|
| 4,012,961 | 3/1977 | Cameron . |
| 4,025,132 | 5/1977 | Watanabe . |
| 4,025,135 | 5/1977 | Hishida . |
| 4,490,128 | 12/1984 | Weiss et al. ......................... 474/166 |
| 4,534,749 | 8/1985 | Hans et al. .......................... 474/174 |
| 4,571,226 | 2/1986 | Molloy et al. . |
| 4,767,387 | 8/1988 | Matsuoka et al. ................ 474/174 X |

*Primary Examiner*—Michael Powell Buiz
*Attorney, Agent, or Firm*—Wayne A. Jones; Richard D. Fuerle

[57] ABSTRACT

Disclosed is a method of making a wheel assembly such as a pulley with a bearing. A wheel is molded from a material that shrinks when its temperature falls from a temperature above 100° F. to room temperature. The wheel has a circular opening at its center suitable for holding a circular bearing. The diameter of the circular opening when the wheel is at a temperature above 100° F. is greater than the diameter of the circular bearing and is less than the diameter of the circular bearing when the wheel is at room temperature. The bearing is positioned inside the opening when the wheel is at a temperature above 100° F. The wheel is cooled to room temperature and shrinks around the bearing, thereby fixing the bearing to the wheel. Also disclosed is a wheel assembly made by this method.

20 Claims, 2 Drawing Sheets

PLASTIC WHEEL ASSEMBLY

BACKGROUND OF THE INVENTION

This invention relates to a method of making a wheel assembly from a wheel and a bearing and to the assembly product. In particular, it relates to molding a pulley having an opening at its center, positioning a bearing in the opening while the pulley is still hot, and allowing the pulley to cool so that it shrinks around the bearing and holds the bearing in place.

At the present time, pulley assemblies, consisting of a plastic pulley and a metal bearing, are made by placing a bearing in a mold and molding the plastic around the bearing. Since a bearing in the mold is held at the molding temperature during molding, heating the bearing is unavoidable. The high molding temperatures damage the grease and seals in the bearing, reducing the life of the bearing. Also, when the plastic shrinks, it exerts a considerable and often nonuniform force upon the bearing. This force warps and distorts the bearing so that it becomes out-of-round, again reducing the life of the bearing. The damage caused to the bearing by the shrinking plastic is difficult or impossible to control because the amount of shrinking is a property of the plastic material used and the method of molding.

SUMMARY OF THE INVENTION

I have discovered that the problems created by molded in bearings can be avoided by molding the pulley first, then placing the bearing inside an opening in the center of the hot pulley, and allowing the pulley to cool and shrink around the bearing. I have found that this shrinkage after molding is sufficient to firmly fix the bearing to the pulley and prevent the bearing from coming out of the pulley or moving within the pulley. Because the clearance between the outside of the bearing and the inside of the opening in the pulley can be controlled, it is now possible to control the amount of force that the shrinking pulley exerts on the bearing. The amount of force can thereby be selected so that it is sufficient to hold the bearing yet is not so great that it warps or distorts the bearing. The method of this invention does not require extra steps or extra parts, such as the application of an adhesive or the addition of metal clips to hold the bearing in place, and therefore is less expensive and less prone to problems.

DESCRIPTION OF THE PREFERRED EMBODIMENTS

Figure 1:
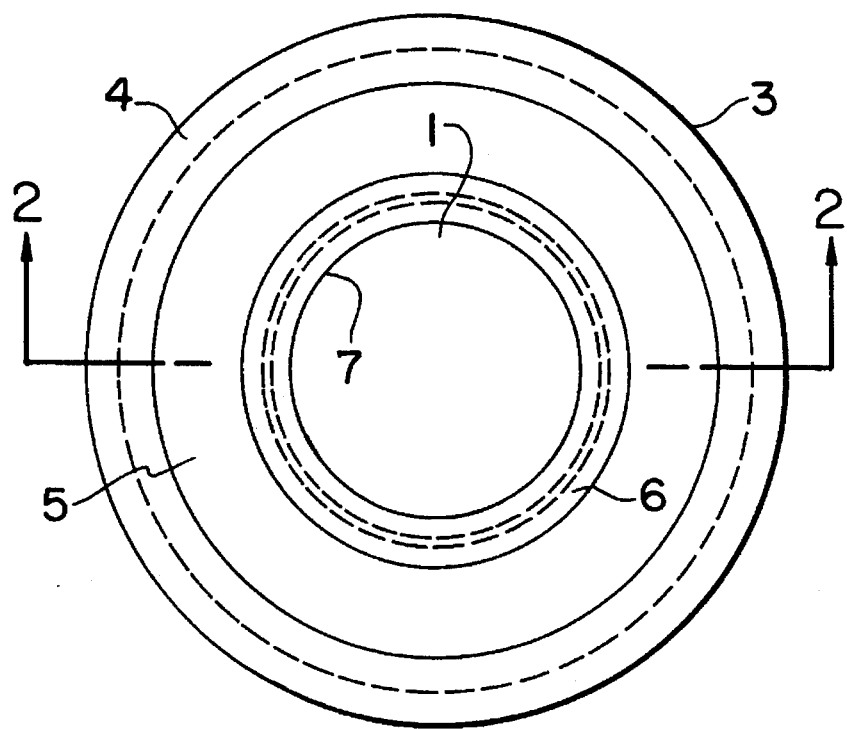
FIG. 1 is a plan view showing a certain presently preferred embodiment of a pulley assembly with a bearing made according to the process of this invention.
Figure 2:
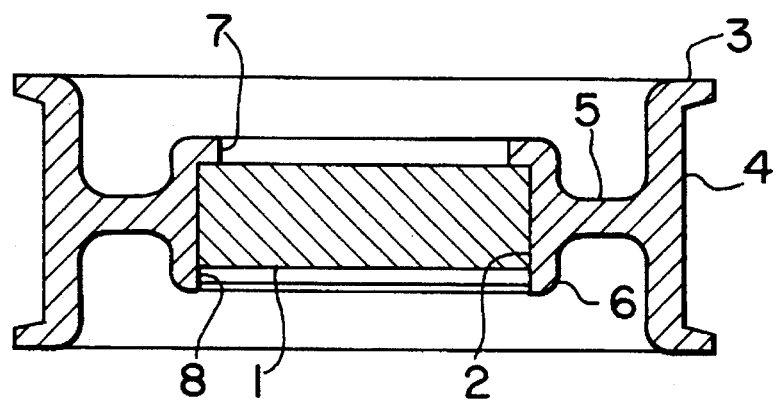
FIG. 2 is a side view in section through line A—A in FIG. 1.

In FIGS. 1 and 2, a bearing 1 has been positioned within aperture 2 of molded pulley 3, which consists of hub 4, web 5, and sheave 6. Hub 4 is shaped appropriately by holding a moving belt. Sheave 6 has a circumferential flange 7 on one side and a small circumferential protuberance 8 on the other side.

Figure 3:
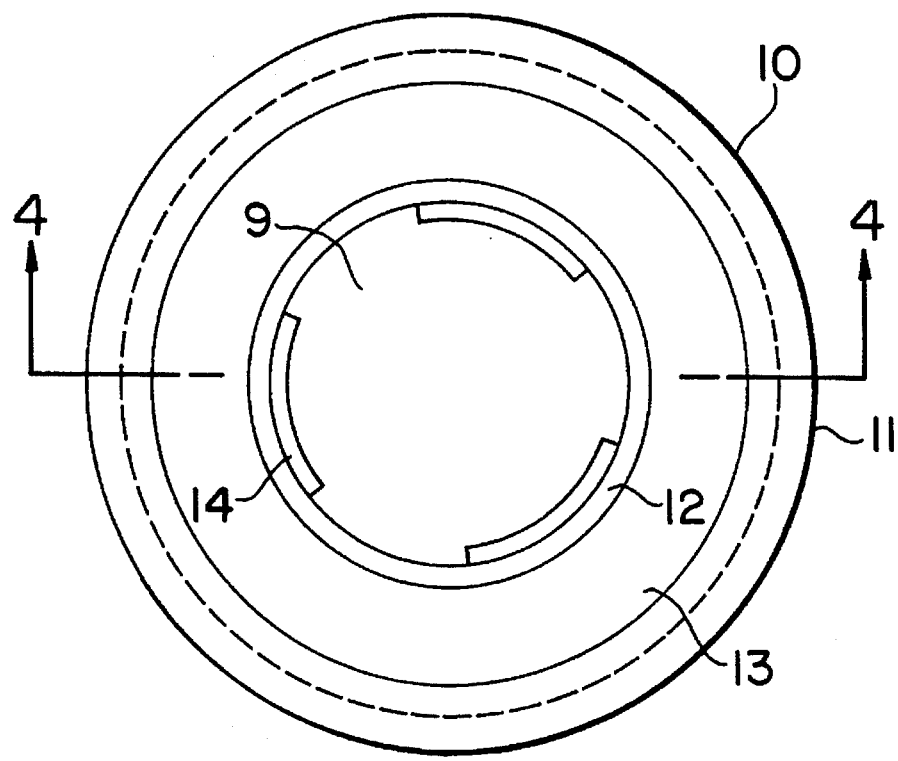
FIG. 3 is a plan view of an alternative pulley assembly with a bearing made according to the process of this invention.
Figure 4:
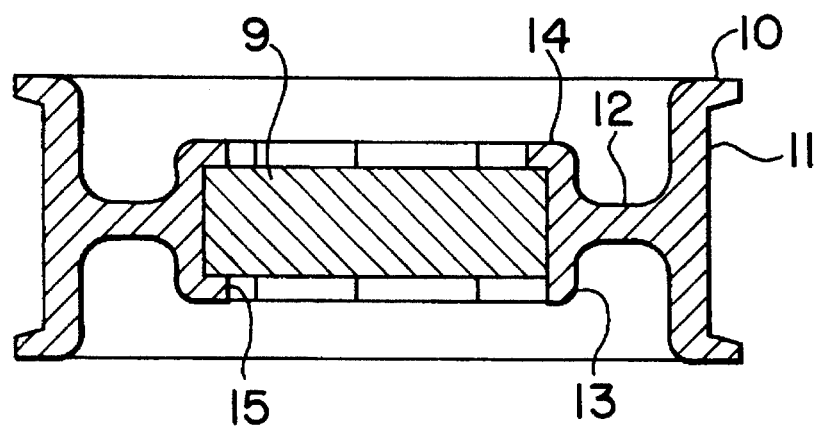
FIG. 4 is a sectional side view through A—A in FIG. 3.

In FIGS. 3 and 4, a circular bearing 9 is positioned within pulley 10 consisting of hub 11, web 12, and sheave 13. Three protuberances 14 extend from one side of sheave 13 and three opposing protuberances 15 extend from the opposite side of sheave 13. (The purpose of opposing protuberances is to facilitate molding.)

In the method of this invention, a wheel having a center aperture is molded. The material from which the wheel is formed must shrink when it is cooled from a temperature above about 100° F. (38° C.) to room temperature. The temperature above 100° F. is preferably in the range of 250° F. (121° C.) to 300° F. (149° C.). The material must, of course, be moldable, either by injection molding or compression molding or some other molding method. Moldable materials include plastics, ceramics, metals, glasses, and other materials which can be placed in a mold in a liquid or pliable form and released from a mold as a rigid solid. Plastics are preferred as they have many commercial applications, thermoset plastics are more preferred as they are tougher and more heat resistant, phenolics are still more preferred, and phenol-formaldehyde resins are most preferred.

Normally, the wheel must be molded at a high temperature and so usually the bearing can be inserted into the aperture at the center of the wheel immediately after molding. However, some wheel materials can be molded at low temperatures, in which case it will be necessary to heat them before inserting the bearing.

While the shrinking molded wheel provides an adequate adherence of the bearing to the disc, for extra assurance it is preferable to provide a protuberance extending into the aperture. The protuberance is located so as to help hold the bearing immobile within the wheel. The protuberance is preferably circumferential but it need not be continuous. The protuberance may extend into a corresponding depression within the bearing, but preferably the protuberance is positioned at the rim of the bearing so that it is not necessary to modify the shape of the bearing. Preferably, the cross-section of the protuberance is an arc of a circle and the radius of that arc extends from a point that lies within the material of the wheel as protuberances of that design do not prevent the mold from being withdrawn from the wheel, nor do they break off when the mold is withdrawn from the wheel.

The circular bearing is typically metallic, (e.g., steel), but could be constructed of other materials as well. The outside diameter of the bearing is less than the diameter of the aperture of the wheel when the wheel is at a temperature over 100° F., but is less than the diameter of the aperture when the wheel is at room temperature. Also, if a protuberance is present, the outside diameter of the bearing is preferably greater than the smallest inside diameter of the protuberance when the wheel is at a temperature over 100° F., so that the bearing must be pressed or snapped into the aperture.

As the wheel cools it shrinks, exerting a pressure or force upon the bearing. This force must be sufficient to fix the bearing within the wheel yet insufficient to distort the bearing. The clearance between the outside diameter of the bearing and the inside diameter of the aperture when the disc is at a temperature over 100° F. is adjusted to control the force exerted by the disc on the bearing when the disc cools to room temperature. Depending on how much the material of the wheel shrinks, the diameter of the bearing may be about 0.001 to about 0.005 inches greater than the diameter of the aperture when the wheel is at room temperature and no bearing is in the aperture. For phenol-formaldehyde resins that shrink 1/1000 to 11/1000 inches per inch from the temperature of molding (about 350° F.) to room temperature, good results are usually obtained if the bearing is about 0.003 inches greater in diameter than the aperture when the wheel is at room temperature and a bearing is in the aperture. Once the bearing has been positioned within the aperture of the wheel, the wheel is cooled to room temperature.

While it is not preferred due to the additional pieces and steps required, nor is it necessary, it is also possible to mold the wheel with indentations suitable for accepting a metal clip to assist in holding the bearing in position. Also, while adhesives are not preferred as they require a dispensing system, nor are they necessary, an adhesive that is tolerant of the lubricants and heat and will not damage the bearing or its parts can be used to assist in holding the bearing to the wheel. Examples of adhesives that may be suitable include epoxies, acrylates, isocyanates, and urethanes.

Wheel assemblies that can be produced by the method of this invention include tensioner or idler pulleys which take up the slack on a belt system. Such pulleys have many applications in automobile accessory drives and on industrial belt systems. However, wheel assemblies made by the process of this invention can also be used for many other applications such as the wheels on carts or to hold the blades for an industrial belt-driven fan.

I claim:

1. A method of making a wheel assembly comprising
   (1) molding a wheel from a material that shrinks when its temperature falls from a temperature above 100° F. to room temperature, said wheel having a circular opening at its center suitable for holding a circular bearing, where the diameter of said circular opening is greater than the diameter of said circular bearing when said wheel is at a temperature above 100° F. and is less than the diameter of said circular bearing when said wheel is at room temperature;
   (2) positioning said bearing inside said opening when said wheel is at said temperature above 100° F.; and (3) cooling said wheel to room temperature.

2. A method according to claim 1 wherein said temperature above 100° F. is between 250° and 300° F.

3. A method according to claim 1 wherein said material is a plastic.

4. A method according to claim 3 wherein said plastic is a thermoset plastic.

5. A method according to claim 4 wherein said thermoset plastic is a phenolic.

6. A method according to claim 5 wherein said phenolic is a phenol-formaldehyde resin.

7. A method according to claim 1 wherein said wheel has a protrusion that extends into said circular opening which prevents said bearing from coming out of said opening, and said bearing is snapped into said opening over said protrusion.

8. A method according to claim 7 wherein said protrusion extends around the circumference of said opening.

9. A method according to claim 8 wherein the radius of said protrusion extends from a point inside said material.

10. A method according to claim 1 wherein the diameter of said bearing exceeds the diameter of said opening, when no bearing is therein and said wheel is at room temperature, by about 0.001 to about 0.005 inches.

11. A method according to claim 1 wherein the force between said wheel and said bearing at room temperature is sufficient to fix said bearing to said wheel but insufficient to distort said bearing.

12. A method according to claim 1 wherein the rim of said wheel is shaped for holding a belt.

13. A method according to claim 1 wherein the rim of said wheel is shaped for rolling across a floor.

14. A wheel assembly made according to the method of claim 1.

15. A method of making a pulley assembly comprising
   (A) molding a pulley from a phenol-formaldehyde resin that shrinks when it is cooled to room temperature from an elevated temperature between about 250° F. and about 300° F., said pulley having a circular opening at its center, said opening having a flange on one side and a circumferential protuberance on the other side;
   (B) when said pulley is at said elevated temperature, pressing into said opening a circular bearing having an outside diameter
      (1) greater than the inside diameter of said protuberance at said elevated temperature,
      (2) less than the inside diameter of said opening at said elevated temperature, and
      (3) sufficiently greater than the inside diameter of said opening at room temperature to fix said bearing to said pulley at room temperature, but not so much greater as to cause distortion of said bearing; and
   (C) cooling said pulley to room temperature.

16. A method according to claim 15 wherein the cross-section of said protuberance is an arc of a circle and the radius of said arc extends from a point inside said pulley.

17. A pulley assembly made according to the method of claim 15.

18. A wheel assembly comprising a circular wheel having a circular aperture at its center made from a moldable material that shrinks when its temperature falls from a temperature over 100° F. to room temperature, heat shrunk over a circular bearing placed inside said circular opening.

19. A wheel assembly according to claim 18 wherein the rim of said wheel is shaped for holding a belt.

20. A wheel assembly according to claim 18 wherein the rim of said wheel is shaped for rolling across a floor.

* * * * *